United States Patent Office

2,957,901
Patented Oct. 25, 1960

2,957,901

CYCLOPENTADIENYLTRIALKOXYSILANES AND DERIVATIVES THEREOF

Melvin M. Olson, Milwaukee, and Roger M. Christenson, Whitefish Bay, Wis., assignors to Pittsburgh Plate Glass Company, Allegheny County, Pa.

No Drawing. Filed Apr. 20, 1954, Ser. No. 424,488

6 Claims. (Cl. 260—448.8)

This invention relates to derivatives of cyclopentadiene and alkoxy or aryloxy silanes, and to an improved method of preparing the same, and it has particular relation to hydrolyzable cyclopentadienylalkoxysilanes and to their preparation by a relatively simple and inexpensive technique.

It has heretofore been suggested to prepare cyclopentadienyl derivatives of organo silanes containing silicon-carbon (Si-C) groups. The reaction was commonly conducted by a Grignard synthesis, which is relatively expensive. Moreover, the alkyl derivatives of silicon containing a Si-C linkage are relatively expensive to obtain. In many instances, these organo derivatives of cyclopentadiene and silicon could not be hydrolyzed to provide further extension of the molecules through silicon-oxygen linkage.

This invention comprises a novel class of silanes which are cyclopentadienyl derivatives of silicon, characterized by at least one ester (—O—R) group, where R is hydrocarbon (either alkyl or aromatic), and being of the probable formula

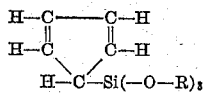

where R is hydrocarbon such as methyl, ethyl, propyl, isopropyl, butyl, isobutyl, phenyl, tolyl, etc. It also comprises a novel method of preparing them by reaction of cyclopentadienylsodium and haloalkoxy or aryloxy silanes. The invention further comprises derivatives of this material, as will subsequently be described.

The cyclopentadienylalkoxysilanes or cyclopentadienylaryloxysilanes of this invention are soluble in solvents such as xylene, toluene, 1,2-dimethoxyethane, diethyl ether, or the like. They can also be hydrolyzed, preferably in water and a water soluble alcohol, to form a cyclopentadienylpolysiloxane. If hydrolysis is carried to a maximum, the product is an insoluble monoalkyl polysiloxane, but by stopping hydrolysis short of the final degree to provide a higher ratio of alkoxyl to silicon, a product soluble in the above mentioned solvents is obtained.

It is also possible to obtain soluble, fully hydrolyzed products by cohydrolyzing a cyclopentadienylalkoxysilane with an alkylchlorosilane such as dimethyl, or diethyl, or dibutyl dichlorosilane. Even though the cohydrolysis is carried to the ultimate degree, if sufficient of the dialkyldichlorosilane is present to provide a ratio of alkyl to silicon of about 1.2, or greater, the product is still soluble and can be used as a valuable coating material. Naturally, mixtures of cyclopentadienylalkoxysilanes and dialkyldichlorosilanes in an intermediate stage of hydrolysis are also soluble.

The cyclopentadienylalkoxysilanes and polysiloxanes, when liquid, or dissolved in a solvent, are useful coating agents for wood, metal, and stone, or other surfaces which may be desirable to provide with decorative and/or protective coatings. The films, owing to presence of the cyclopentadienyl groups tend to air dry. They can also be dried by baking in an oven under infrared irradiation to a hard resistant state.

The cyclopentadienyl group, before or after hydrolysis of the cyclopentadienylalkoxysilane, is capable of numerous reactions of diene synthesis with dienophiles. They may, for example, react by a Diels-Alder reaction with maleic anhydride. They may also react by addition with glyceride oils, notably those of the drying or semi drying type such as linseed oil, soya oil, or with phthalic glycerides and other alkyd bodies containing oils, or their fatty acids, as modifiers.

They can also be caused to react by addition with monomers, such as styrene, vinyl chloride, vinyl toluene, and the like, in the presence of catalysts such as boron trifluoride, aluminum chloride, sulfuric acid and others.

A relatively simple method of preparing the cyclopentadienylalkoxysilanes of this invention comprises the reaction of cyclopentadienylsodium with a halo-alkoxy, or aryloxy silane such as chlorotrimethoxy, or chlorotriethoxy, or chlorotributoxy silane.

The preparation of cyclopentadienyl sodium may be conducted by contacting cyclopentadiene, preferably in a solvent such as 1,2 dimethoxyethane, with finely divided metallic sodium, or by contacting cyclopentadiene with phenylsodium in an appropriate medium.

The preparation of phenylsodium suitable for use in the preparation of cyclopentadienylsodium has been described in the text books and specific description of the method is not believed necessary. However, it may be stated that it may conveniently be effected by contacting chlorobenzene with finely divided sodium.

Trialkoxyhalosilanes suitable for reaction with cyclopentadienylsodium or cyclopentadienylpotassium can be prepared by reaction of a silicon tetrahalide and a suitable alcohol (preferably non-aqueous).

The reaction is illustrated by the preparation of triethoxychlorosilane which was conducted as follows:

*Example A*

The reaction vessel comprised a flask which was immersed in an ice bath and into which was introduced 1700 grams of silicon tetrachloride. The alcohol (absolute ethanol) was stirred into this mixture over a period of 4¼ hours. Agitation on the ice bath was continued for about 1½ hours, at the conclusion of which time, the flask was removed from the bath, a reflux condenser was attached and the mixture was refluxed for ½ hour. Subsequently, the reaction product was left to stand overnight, but the next day the mixture was further refluxed for 1 hour and was then subjected to distillation. The distillation was continued until a boiling point of 160° C. was attained and all of the distillate boiling in this range was collected and redistilled. That fraction boiling in the range of 52° C. at an absolute pressure of 9 millimeters of mercury to 57° C. at 7 millimeters of mercury (absolute) was saved and comprised a yield of 1612.1 grams. This fraction was deemed to consist very largely of triethoxychlorosilane. This product could be reacted with cyclopentadienylsodium in the manner previously described to form triethoxycyclopentadienylsilane. The latter compound, in turn, could be hydrolyzed, preferably in the presence of alkyl-or phenylchlorosilanes, to form cyclopentadienylsiloxanes which were soluble and adapted for application as coating media.

In like manner, chlorotributoxysilane may be prepared by the reaction of silicon tetrachloride and butanol. This preparation is illustrated by the following example:

*Example B*

A five liter, three necked flask was employed as a reaction vessel. The flask was equipped with a stirrer, a reflux condenser and a dropping funnel. It was cooled in a bath of a mixture of Dry Ice and water to a temperature of 0° C.

The reaction charge comprised:

Silicon tetrachloride _____ 1700 grams (10 moles).
Butanol _____ 2220 grams (30 moles).

The silicon tetrachloride was added drop-wise with agitation to the cooled butanol over a period of 1½ hours. The mixture was agitated for an additional period at 25° C. and ultimately was left to stand overnight. The next day the mixture was heated 7 hours and 45 minutes at a temperature of 65° C. to 89° C. to drive off excess hydrogen chloride. The mixture was then allowed to stand for a couple of days, but since it was noted that it still contained a small amount of hydrogen chloride, it was heated to about 100° C. and swept with inert gas, namely combustion gases from the burning of butane in air, until hydrogen chloride was eliminated or substantially eliminated. It was then allowed to stand overnight at room temperature and the next day was distilled under a pressure of 12 millimeters of mercury (absolute). A forerun boiling in a range of 40° C. at 20 millimeters of pressure (absolute) to 120° C. at 14 millimeters pressure (absolute) was obtained. This was followed by a fraction boiling at 125° C. under an absolute pressure of 12 millimeters pressure to 129° C. under a like pressure. A further fraction boiling at 129° C. at 12 millimeters absolute pressure to 130° C. at 12 millimeters pressure absolute was obtained. These fractions comprised chlorotributoxysilane suitable for reaction with cyclopentadienylsodium or cyclopentadienylpotassium to provide cyclopentadienyltributoxysilane. The latter product was susceptible of further hydrolyzation in water and butyl alcohol mixture.

The preparation of cyclopentadienyltriethoxysilane is illustrated by the following example:

Example I

Two gram atoms (46 grams) of sodium was placed in a two-liter round-bottom, dry and nitrogen flushed flask containing xylene and being equipped with a sealed stirrer, a dropping funnel, and a reflux condenser which was protected by a calcium chloride tube. The flask was heated to the fusion point of the sodium and the mixture was agitated to disperse the melt as a fine sand in the xylene.

The sodium sand in the xylene was cooled to room temperature and addition of 157 grams (1 mole) of bromobenzene was initiated and was continued slowly while the mixture was rapidly heated to reflux temperature. The reflux was maintained at a gentle rate by control of the rate of addition of bromobenzene and at the conclusion of the addition of the bromobenzene, the mixture was allowed to stand until reaction was complete, as was indicated by the subsidence of the evolution of heat. Phenylsodium was formed by the reaction.

The solution was cooled to 15° C. and 66 grams (1 mole) of freshly distilled cyclopentadiene was added, after which the mixture was stirred for 2½ hours to form cyclopentadienylsodium.

To the solution of cyclopentadienylsodium thus produced, was added 198 grams (1 mole) of chlorotriethoxysilane prepared as in Example A and the mixture was allowed to stand for two days. The reaction product was filtered and the filtrate was distilled, that portion distilling up to 47° C. at a pressure of 2 millimeters of mercury (absolute) was collected as a forerun and was not used. A second fraction, distilling from 47° C. at 2 millimeters pressure (absolute) to 145° C. at 3 millimeters pressure (absolute), was obtained. This fraction, weighing 135.5 grams, was redistilled and a fraction boiling in a range of 80° C. to 118° C. at a pressure of 3 millimeters of mercury (absolute) was obtained. This product was largely cyclopentadienyltriethoxysilane and was further purified by distillation in a so-called Vigreux column of 55 centimeters length. The purified product had a boiling point of 94° C. to 95° C. at a pressure of 2 millimeters of mercury (absolute). This product was cyclopentadienyltriethoxysilane of relatively high purity. It could be partially hydrolyzed with water and alcohol to provide cyclopentadienylethoxypolysiloxane which was soluble in xylene and toluene, or similar solvents, and which when applied as a film to a surface of steel or the like, could be air dried or baked to a hard durable state. The product of complete hydrolysis was insoluble; but the cyclopentadienyltriethoxysilane could also be mixed with a sufficient number of moles of dichlorodimethylsilane to provide an average of about 1.2 or more alkyl groups per silicon atom. This mixture, either completely or but partially hydrolyzed, could also be dissolved in a solvent medium such as xylene or toluene and employed as a coating medium for wood, iron, stone, or the like.

Example II

In this example cyclopentadienyltributoxysilane was prepared by the reaction of cyclopentadienylsodium with chlorotributoxysilane, prepared as in Example B. The apparatus employed in this reaction comprised a three-neck, round bottom flask, equipped with a stirrer having a rubber seal, a thermometer, an inlet for nitrogen gas, and a reflux condenser. The flask was first charged with a small amount of toluene and 46 grams (2 atoms) of sodium was added. The flask was filled with nitrogen and a slow stream of nitrogen was maintained while the contents were heated until the sodium was melted; the stirrer was then started and run until the sodium had dispersed as a fine sand. The stirrer was stopped and the contents of the flask were allowed to cool to room temperature.

The stirrer was again started, the flask was immersed in a cooling bath and 112.5 grams (1 mole) of chlorobenzene was added at such rate as to hold the temperature in the flask at 25° C. to 40° C. (mostly within the range of 25° C. to 30° C.). During the addition of the chlorobenzene an exothermal reaction occurred and phenylsodium was formed. Stirring was continued until the heat of the reaction had subsided and the reaction was deemed complete.

Subsequently, 259 grams (4 moles) of freshly distilled cyclopentadiene was slowly added to the phenylsodium, while the temperature in the reaction vessel was held below 40° C. A second exothermic reaction took place indicating the formation of cyclopentadienylsodium. After the reaction had subsided, 282.5 grams (1 mole) of chlorotributoxysilane was added. The mixture was maintained overnight under agitation, but without heat, and then was refluxed for 2 hours, filtered and distilled. Two fractions were taken, one boiling at 122° C. to 126° C. at 0.5 millimeters of pressure (absolute), and a second boiling at 126° C. to 155° C. under like conditions. These fractions were respectively of the refractive indices of $N_D^{25}$ 1.4468 and $N_D^{25}$ 1.4610. The fractions reacted with maleic anhydride exothermically and constituted predominantly cyclopentadienyltributoxysilane. They may be hydrolyzed by boiling with water and alcohol to provide polysiloxanes. By appropriate regulation of the degree of hydrolysis, soluble or insoluble products may thus be obtained. Likewise, the fractions may be cohydrolyzed with a chloroalkylsilane, such as dimethyldichlorosilane, in an amount to provide at least 1.2 moles of alkyl groups per silicon atom.

It is also within the purview of the invention to react the cyclopentadienyltributoxysilane prepared by this example, its hydrolysis product, or the product of cohydrolysis of said cyclopentadienyltributoxysilane and dimethyldichlorosilane, with a drying oil, or drying oil modified alkyd, to provide useful soluble coating materials.

Example III

Finely divided sodium was prepared by agitation of a mixture of 46 grams of molten sodium in toluene. The toluene was decanted off and the finely divided sodium was rinsed twice with dry 1,2-dimethoxyethane and an additional quantity of the latter compound was added to provide a medium for the subsequent reaction.

Freshly distilled cyclopentadiene in an amount of 264 grams (4 moles) was added, whereupon a reaction accompanied by evolution of gas and heat occurred. The reaction temperature was maintained at a value of 40° C. to 48° C. until the reaction subsided and the color had become pink, indicating the formation of cyclopentadienylsodium.

To the mixture was added 565 grams (2 moles) of chlorotributoxysilane. The color of the reaction mixture turned from pink to light green. The mixture was stirred overnight at room temperature and the next day it was refluxed for 9 hours and was then coled and filtered. The filtrate was distilled to obtain a forerun of 138 grams which was not further used.

Subsequently, the following fractions were distilled:

| Fraction No. | Boiling Range | | | |
|---|---|---|---|---|
| | Low Temperature | | High Temperature | |
| | Temp.,° C. | Pressure, mm. | Temp.,° C. | Pressure, mm. |
| I | 42 | 0.4 | 111 | 0.3 |
| II | 111 | 0.3 | 118 | 0.35 |
| III | 118 | 0.35 | 190 | 0.35 |
| IV | 190 | 0.35 | 200 | 0.35 |

Fraction II, which was deemed to be especially rich in cyclopentadienyltributoxysilane, was further distilled up to a temperature of 101° C. at 35 millimeters of mercury (absolute) and the residue was combined with fractions III and IV from above.

The mixture was again distilled to give the following fractions:

| Cut Number | Boiling Range | | | |
|---|---|---|---|---|
| | Low Temperature | | High Temperature | |
| | Temp.,° C. | Pressure, mm. | Temp.,° C. | Pressure, mm. |
| I | 109 | 0.35 | 119 | 0.35 |
| II | 119 | 0.35 | 125 | 0.45 |
| III | 125 | 0.45 | 191 | 0.65 |

Fraction II reacts with maleic anhydride and is cyclopentadienyltributoxysilane with minor amounts of impurities.

This fraction was still further purified by distillation to give the following fractions:

| Fraction No. | Boiling Range | | | |
|---|---|---|---|---|
| | Low Temperature | | High Temperature | |
| | Temp.,° C. | Pressure, mm. | Temp.,° C. | Pressure, mm. |
| I | 103 | 0.40 | 109 | 0.40 |
| II | 109 | 0.40 | 112 | 0.40 |
| III | 112 | 0.40 | 115 | 0.48 |
| IV | 115 | 0.48 | 117 | 0.48 |

A slight residue remained. Fraction I was small and did not react with maleic anhydride. Fractions II, III and IV constituted the major portion of the material; all reacted with maleic anhydride. They were cyclopentadienyltributoxysilanes of relative purity, useful for hydrolysis, with or without adding dichlorodialkylsilane, to form coating materials soluble in xylene, toluene, 1,2-dimethoxyethane and others.

In Examples I through III, sodium may be replaced by other alkali metals such as potassium.

Example IV

Cyclopentadienyltributoxysilane of a boiling point of 127° C. at 0.42 millimeters (absolute) pressure, was reacted with maleic anhydride as follows: The reaction flask was charged with 3.04 grams of maleic anhydride in 15.5 grams of benzene, and to this solution was added 9.7 grams of the cyclopentadienyltributoxysilane, whereupon the temperature rose quickly. The mixture was allowed to stand overnight and the benzene was removed under vacuum. A light colored oil, having a refractive index of $N_D^{25}$ 1.4670 and a density of 1.0630 at 25° C., remained.

The product was soluble in benzene and toluene and the like. It could be hydrolyzed in water and alcohol in well known manner characterizing silanes containing a hydrolyzable group. If hydrolysis was partial, soluble products suitable for use as coating media could be obtained.

Example V

To the cyclopentadienyltributoxysilane of Example II, add dimethyldichlorosilane. The amount will depend upon the degree of hydrolysis to be conducted upon the mixture. If the hydrolysis is to be carried to completion, 0.25 moles of dimethyldichlorosilane per mole of cyclopentadienyltributoxysilane is suggested. The mixture is hydrolyzed with water and a lower water soluble alcohol, preferably with removal of hydrogen chloride by subsequent washing with water. One may thus obtain a soluble mixed cyclopentadienylmethyl-polysiloxane, films of which can be cured by air drying, or by baking to a hard, durable state.

Example VI

To the cyclopentadienylbutoxysilane of Example II, add a molecular equivalency, based upon the cyclopentadienyl groups (or if desired an excess thereof) of a drying oil such as linseed or a semi-drying oil such as soya oil and heat the mixture preferably under an inert atmosphere to effect addition reaction, thus to form a silicon modified oil.

Example VII

Repeat Example VI, but replace the oil with a
$$>C=CH_2$$
monomer, namely styrene.

Example VIII

In accordance with the provisions of this example replace the chlorotributoxysilane of Example III with dichlorodiphenoxysilane and proceed as in the latter example. The product can be hydrolyzed with water and alcohol. It can also be reacted with maleic anhydride to form addition products. Likewise, the resultant biscyclopentadienyldiphenoxysilane can be hydrolyzed with other chloro- or alkoxy-silanes to provide products soluble in aromatic solvents and being useful for coating media in various applications.

It will be apparent to those skilled in the art that the embodiments herein disclosed and described are by way of example or illustration. Numerous modifications may be made therein, without departure from the spirit of the invention or the scope of the appended claims.

We claim:

1. As a new compound, a cyclopentadienyltrialkoxysilane.
2. As a new compound, cyclopentadienyltributoxysilane.
3. As a new composition of matter:

$$(cyclopentadienyl)Si(OC_2H_5)_3$$

4. A method of forming a coating material which is soluble in xylene, said method comprising cohydrolyzing a mixture of cyclopentadienyltrialkoxysilane and an alkyl silane containing 1 to 2 halogen atoms per molecule, said cohydrolysis being effected in a solution of water and water soluble alcohol.

5. As a new material, a cyclopentadienylalkoxypolysiloxane which is soluble in xylenes, said material being the product of partial hydrolysis in a solution of water and alcohol of cyclopentadienyltrialkoxysilane.

6. As a new material, the product of reaction of cyclopentadienyltributoxysilane and maleic anhydride.

References Cited in the file of this patent

UNITED STATES PATENTS

| | | |
|---|---|---|
| 2,012,372 | Bockmühl et al. | Aug. 27, 1935 |
| 2,171,867 | Scott et al. | Sept. 5, 1937 |
| 2,238,669 | Wiley | Apr. 15, 1941 |
| 2,386,452 | Fleming | Oct. 9, 1945 |
| 2,398,672 | Sauer | Apr. 16, 1946 |
| 2,563,074 | Schmerling | Aug. 7, 1951 |
| 2,667,501 | Martin | Jan. 26, 1954 |

OTHER REFERENCES

Rochow: "Chemistry of the Silicones," 2nd Edition, Wiley & Sons, Inc., N.Y. (1946), pages 61, 104–106.

Scott: "Jour. Am. Chem. Soc.," vol. 68 (1946), p. 356.

Rochow: "Introduction to the Chemistry of the Silicones," 2nd Ed. (1952), pp. 51–57, Wiley & Sons Inc., publisher, N.Y.

Frisch: Jour. Am. Chem. Soc., vol. 75, No. 23 (1953), pp. 6050–6051, effective date (the received date) is June 19, 1953.